US010766282B2

(12) United States Patent
Fujii et al.

(10) Patent No.: US 10,766,282 B2
(45) Date of Patent: Sep. 8, 2020

(54) IMAGE FORMING APPARATUS, RECORDING MEDIUM CONVEYING METHOD, AND RECORDING MEDIUM

(71) Applicants:Masayuki Fujii, Kanagawa (JP);
Nobuyuki Satoh, Kanagawa (JP);
Suguru Masunaga, Kanagawa (JP);
Satoshi Iwanami, Kanagawa (JP)

(72) Inventors: Masayuki Fujii, Kanagawa (JP);
Nobuyuki Satoh, Kanagawa (JP);
Suguru Masunaga, Kanagawa (JP);
Satoshi Iwanami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/294,613

(22) Filed: Mar. 6, 2019

(65) Prior Publication Data

US 2019/0283469 A1 Sep. 19, 2019

(30) Foreign Application Priority Data

Mar. 19, 2018 (JP) .................................. 2018-051810

(51) Int. Cl.
*B41J 11/00* (2006.01)
*B41J 13/00* (2006.01)
(Continued)

(52) U.S. Cl.
CPC ......... *B41J 13/0009* (2013.01); *B41J 2/2103* (2013.01); *H04N 1/00596* (2013.01); *H04N 1/6044* (2013.01)

(58) Field of Classification Search
USPC .................................................... 347/19, 43
See application file for complete search history.

(56) References Cited

U.S. PATENT DOCUMENTS 6,300,968 B1 * 10/2001 Kerxhalli .......... G03G 15/0152
347/116
9,211,722 B2 12/2015 Yoneyama
(Continued)

FOREIGN PATENT DOCUMENTS

| JP | 2008-254221 | 10/2008 |
| JP | 2011026045 A | 2/2011 |
| JP | 2015-131483 | 7/2015 |

OTHER PUBLICATIONS

European Search Report; Application EP19158433; dated Aug. 26, 2019.

*Primary Examiner* — Lam S Nguyen
(74) *Attorney, Agent, or Firm* — Duft & Bornsen, PC

(57) ABSTRACT

An image forming apparatus includes a conveyance device to convey a recording medium in a first direction and a second direction opposite the first direction; an image forming device; an imaging device; and circuitry to control the image forming apparatus. Controlled by the circuitry, the image forming device forms the colorimetric pattern on the recording medium that has been conveyed in the first direction by a predetermined distance after the marker pattern is formed. Controlled by the circuitry, after the colorimetric pattern is fixed, the circuitry causes the conveyance device to convey the recording medium in the second direction by an amount equivalent to a distance from the marker pattern to an imaging position by the imaging device plus a margin, conveys the recording medium in the first direction until the imaging device detects the marker pattern, and conveys the recording medium in the first direction to a colorimetry position.

12 Claims, 13 Drawing Sheets

(51) Int. Cl.
*B41J 2/21* (2006.01)
*H04N 1/60* (2006.01)
*H04N 1/00* (2006.01)

(56) References Cited

U.S. PATENT DOCUMENTS

| | | | |
|---|---|---|---|
| 2011/0211011 A1* | 9/2011 | Hoshi | B41J 2/2146 347/19 |
| 2013/0135698 A1* | 5/2013 | Sumioka | H04N 1/00607 358/498 |
| 2013/0147872 A1* | 6/2013 | Yoneyama | H04N 1/6033 347/19 |
| 2015/0063835 A1 | 3/2015 | Takemura | |
| 2015/0158309 A1* | 6/2015 | Fujii | H04N 1/6033 347/19 |
| 2016/0156810 A1* | 6/2016 | Nakamura | H04N 1/00023 358/1.9 |

* cited by examiner

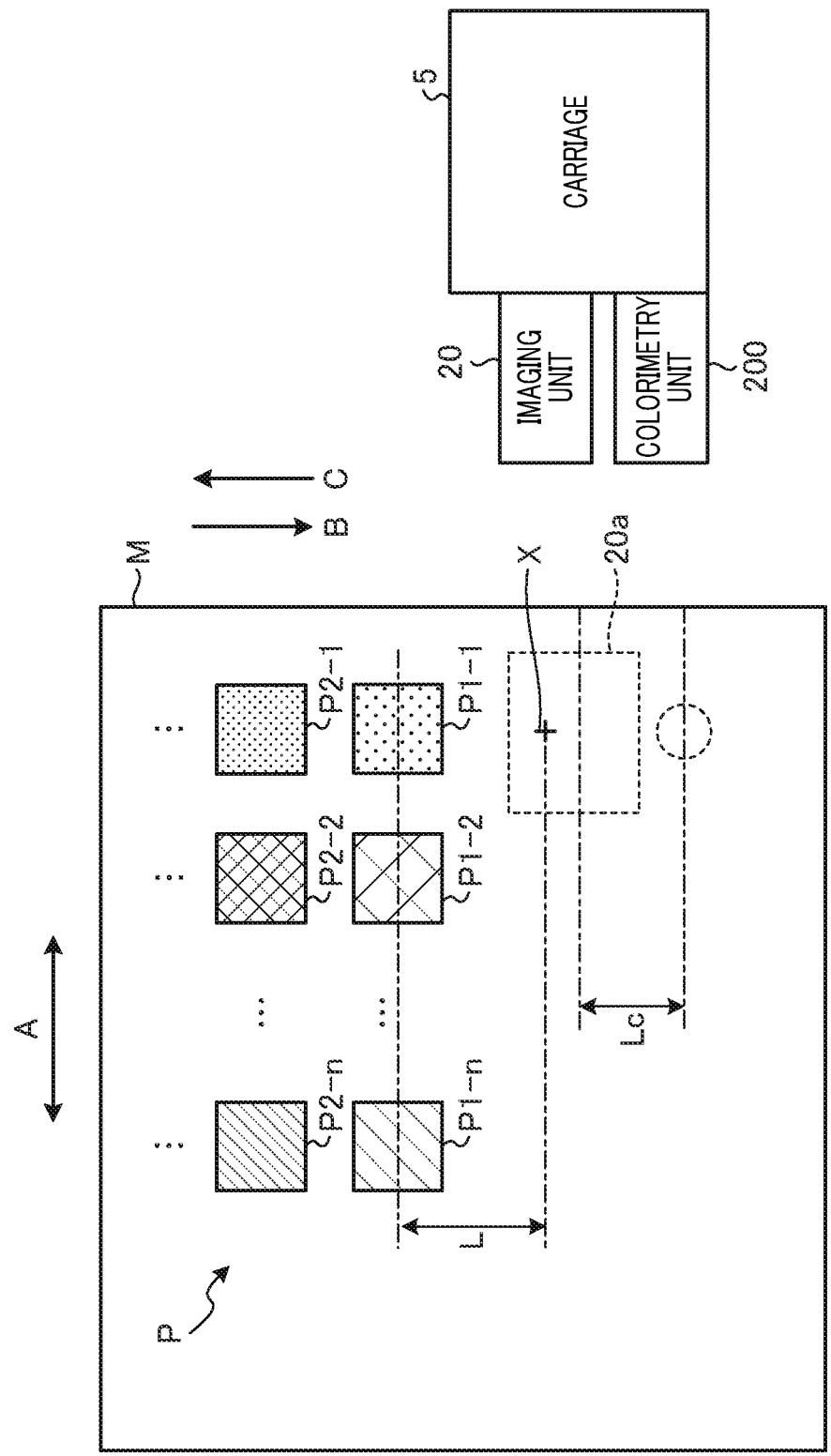

IMAGE FORMING APPARATUS, RECORDING MEDIUM CONVEYING METHOD, AND RECORDING MEDIUM

CROSS-REFERENCE TO RELATED APPLICATION

This patent application is based on and claims priority pursuant to 35 U.S.C. § 119(a) to Japanese Patent Application No. 2018-051810, filed on Mar. 19, 2018, in the Japan Patent Office, the entire disclosure of which is hereby incorporated by reference herein.

BACKGROUND

Technical Field

The present disclosure relates to an image forming apparatus, a recording medium conveying method, and a recording medium.

Description of the Related Art

There are image forming apparatuses in which a recording medium bearing a test pattern is conveyed reverse in a direction of conveyance of the recording medium to a position where the test pattern is detected. For example, there are image forming apparatuses in which a recording medium having a colorimetric pattern formed thereon is conveyed in a sheet conveyance direction, and the colorimetric pattern is dried by a drying device, after which the recording medium is rewound in reverse to perform colorimetry by a colorimeter.

SUMMARY

According to an embodiment of this disclosure, an image forming apparatus includes a conveyance device to convey a recording medium in a first direction and a second direction opposite the first direction, an image forming device to form at least one marker pattern and a colorimetric pattern on the recording medium, an imaging device to capture an image of the at least one marker pattern on the recording medium, and circuitry configured to control an operation of the image forming apparatus. The circuitry causes the image forming device to form the colorimetric pattern on the recording medium that has been conveyed in the first direction by a predetermined distance after formation of the at least one marker pattern. After the colorimetric pattern is fixed, the circuitry causes the conveyance device to convey the recording medium in the second direction by a reverse conveyance amount equivalent to a distance from the at least one marker pattern to an imaging position by the imaging device plus a margin, convey the recording medium in the first direction until the imaging device detects the at least one marker pattern, and convey the recording medium in the first direction to a colorimetry position where colorimetry of the colorimetric pattern is performed.

Another embodiment provides a recording medium conveying method used in an image forming apparatus. The method includes conveying a recording medium bearing a marker pattern by a predetermined distance in a first direction; and conveying the recording medium in a second direction, opposite the first direction, by a reverse conveyance amount after a colorimetric pattern formed at the predetermined distance from the marker pattern is fixed. The reverse conveyance amount is equivalent to a distance from the marker pattern to an imaging position of an imaging device plus a margin. the method further includes conveying the recording medium in the first direction until the imaging device detects the marker pattern; and conveying the recording medium in the first direction to a colorimetry position where colorimetry of the colorimetric pattern is performed.

Another embodiment provides a non-transitory recording medium storing a plurality of program codes which, when executed by one or more processors, causes the processors to perform the recording medium conveying method described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 15 is a diagram illustrating a positional relation between a marker pattern and a colorimetric pattern on a recording medium, the imaging range of the imaging unit, and a colorimetry range of a colorimetry unit after conveyance of the recording medium in the sub-scanning reverse direction.

Figure 1:
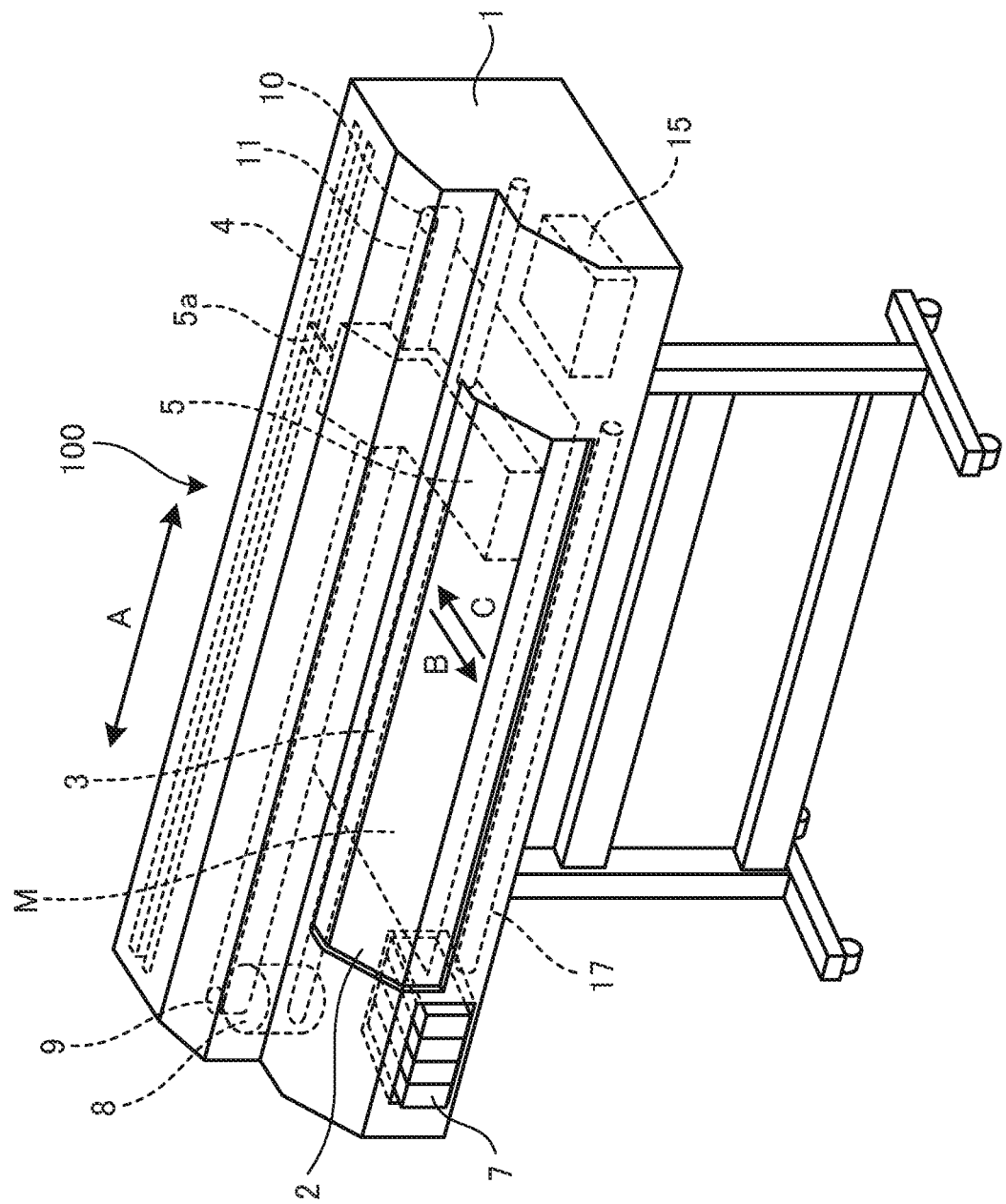
FIG. 1 is a perspective view illustrating an inside of an image forming apparatus according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

As used herein, the singular forms "a", "an", and "the" are intended to include the plural forms as well, unless the context clearly indicates otherwise.

Referring now to the drawings, wherein like reference numerals designate identical or corresponding parts throughout the several views thereof, and particularly to FIG. 1, an image forming apparatus according to an embodiment of this disclosure is described.

The suffixes Y, M, C, and K attached to each reference numeral indicate only that components indicated thereby are used for forming yellow, magenta, cyan, and black images, respectively, and hereinafter may be omitted when color discrimination is not necessary.

Referring now o the drawings, an image forming apparatus, a recording medium conveyance method in detection, and carrier means according embodiments of the present disclosure are described in detail below. In the drawings for explaining the following embodiments, the same reference codes are allocated to elements (members or components) having the same function or shape and redundant descriptions thereof are omitted below.

In the embodiments described below, a serial head inkjet printer is an example of an image forming apparatus to which aspects of the present disclosure is applied.

First, a mechanical structure of an image forming apparatus 100 of the present embodiment will be described with reference to FIGS. 1 to 3. FIG. 1 is a perspective view illustrating an interior of the image forming apparatus 100, FIG. 2 is a plan view illustrating a scanning mechanism of a carriage 5 of the image forming apparatus 100, and FIG. 3 is a side view illustrating a conveyance mechanism of a recording medium M.

Figure 2:
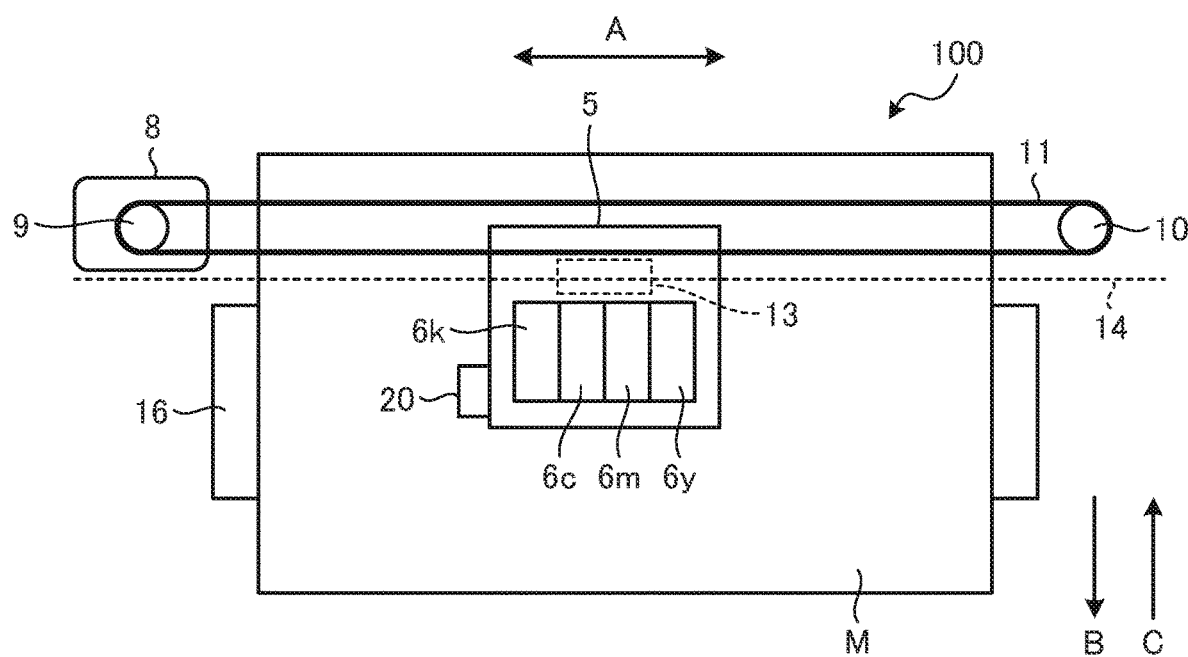
FIG. 2 is a plan view illustrating a scanning mechanism of a carriage of the image forming apparatus illustrated in FIG. 1.
Figure 3:
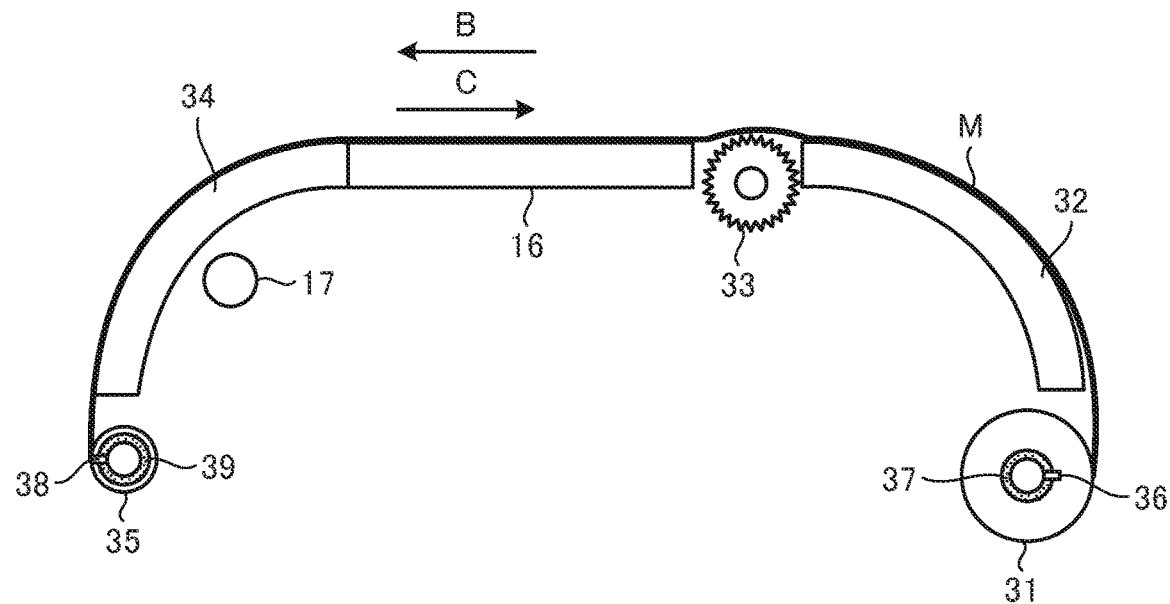
FIG. 3 is a side view illustrating a conveyance mechanism of a recording medium of the image forming apparatus illustrated in FIG. 1.

As illustrated in FIGS. 1 and 2, the image forming apparatus 100 according to the present embodiment includes a carriage 5 to reciprocate in a main scanning direction indicated by arrow A (hereinafter referred to as "main scanning direction A"). The carriage 5 is supported by a main guide rod 3 extending in the main scanning direction A. In addition, the carriage 5 includes a coupler 5a. The coupler 5a engages with a sub guide rail 4 disposed parallel to the main guide rod 3 to stabilize the posture of the carriage 5.

The carriage 5 includes four recording heads 6y, 6m, 6c, and 6k as illustrated in FIG. 2. The recording head 6y discharges yellow (Y) ink. The recording head 6m discharges magenta (M) ink. The recording head 6c discharges cyan (C) ink. The recording head 6k discharges black (Bk) ink. Hereinafter, the recording heads 6y, 6m, 6c, and 6k will be collectively referred to as recording heads 6. The recording head 6 is supported by the carriage 5 so that a discharge face (nozzle face) of the recording head 6 faces down (toward a recording medium M).

A cartridge 7, from which ink is supplied to the recording head 6, is not mounted on the carriage 5. A cartridge 7 is disposed at a predetermined position in the image forming apparatus 100. The cartridge 7 and the recording head 6 are coupled with a pipe so that ink is supplied through the pipe from the cartridge 7 to the recording head 6.

The carriage 5 is coupled to a timing belt 11 extending between a driving pulley 9 and a driven pulley 10. The driving pulley 9 rotates by the driving of the main scanning motor 8. The driven pulley 10 includes a mechanism to adjust the distance with the driving pulley 9 in order to give a predetermined degree of tension to the timing belt 11. As the main scanning motor 8 drives the timing belt 11, the carriage 5 reciprocates in the main scanning direction A. For example, a main-scanning encoder sensor 13 is disposed on the carriage 5 as illustrated in FIG. 2. The main-scanning encoder sensor 13 detects a mark on an encoder sheet 14 and outputs an encoder value. The travel of the carriage 5 is controlled based on the encoder value.

The image forming apparatus 100 according to the present embodiment further includes a maintenance mechanism 15 to maintain the reliability of the recording head 6. For example, the maintenance mechanism 15 cleans the discharge face of the recording head 6, puts a cap on the recording head 6, and discharges unnecessary ink from the recording head 6.

As illustrated in FIG. 2, a platen 16 is disposed below a path along which the carriage 5 reciprocates. The platen 16 is used to support a recording medium M at the time of discharging ink onto the recording medium M from the recording head 6. In other words, the recording medium M is intermittently conveyed by a conveyance mechanism illustrated in FIG. 3 in a sub-scanning direction (sub-scanning forward direction) indicated by an arrow B in FIG. 3. The sub-scanning direction is "first direction". Then, while the carriage 5 is moved in the main scanning direction A above the recording medium M not conveyed in the sub-scanning direction B, the ink is discharged onto the recording medium M on the platen 16 from a nozzle row of the recording head 6 mounted on the carriage 5, thereby forming an image on the recording medium M. After that, the recording medium M having the image formed is further conveyed in the sub-scanning direction B and subjected to drying process by a drying heater 17.

The image forming apparatus 100 according to the present embodiment discharges the ink from the recording head 6 onto the recording medium M in performing calibration such as color adjustment. In the calibration, the image forming apparatus 100 forms, on the recording medium M, a colorimetric pattern including patch groups for colorimetry and a marker pattern to identify a position of the colorimetric pattern. When the ink is not sufficiently dried, the color of the colorimetric pattern is unstable, and a correct colorimetric value can be hardly obtained. Therefore, according to the present embodiment, after forming the colorimetric pattern and the marker pattern on the recording medium M, the image forming apparatus 100 conveys the recording medium M in the sub-scanning direction B to dry the recording medium M with the drying heater 17. Subsequently, the ink is dried, and the color of the colorimetric pattern is stabilized. Then, the recording medium M is conveyed in a sub-scanning reverse direction (sub-scanning backward direction) indicated by an arrow C in the drawings to perform colorimetry of the colorimetric pattern. The sub-scanning backward direction is "second direction".

The image forming apparatus 100 according to the present embodiment includes an imaging unit 20 to perform colorimetry of the colorimetric pattern on the recording medium M. As illustrated in FIG. 2, the imaging unit 20 is supported by the carriage 5 on which the recording head 6 is mounted. The imaging unit 20 can be moved to a desired position on the recording medium M as the recording medium M is conveyed and the carriage 5 moves. The imaging unit 20 performs image capturing when the imaging unit 20 is located at a position facing each of patches of the colorimetric pattern on the recording medium M and calculates a colorimetric value of each of the patches constituting the colorimetric pattern based on RGB (red, green, and blue) values of an image obtained by image capturing (color specification value in a standard color space, for example, a L*a*b* value in a L*a*b* color space). Additionally, as described later, the imaging unit 20 has a function to detect the marker pattern on the recording medium M in order to identify the position of the colorimetric pattern.

Above-described the components of the image forming apparatus 100 according to the present embodiment are disposed in an enclosure 1. The enclosure 1 includes a cover 2 to open and close. When maintenance of the image forming apparatus 100 is performed or when paper jam occurs, the cover 2 is opened, and work relating to the components in the enclosure 1 can be performed.

As illustrated in FIG. 3, the recording medium M is set in the image forming apparatus 100 in a state of being wound around a sheet feeding roller 31. A leading end of the recording medium M is guided by a sheet feeding guide 32, a conveyance roller 33, and the platen 16, and a sheet ejection guide 34 and is secured to a winding roller 35.

The sheet feeding roller 31, the conveyance roller 33, and the winding roller 35 are driven by a sheet feeding motor, a sub-scanning motor, and a winding roller, respectively. In a case of conveying the recording medium M in the sub-scanning direction B, the conveyance roller 33 and the winding roller 35 are rotated in a counterclockwise direction in FIG. 3. At this point, a rotation speed of the sheet feeding roller 31 is controlled so that torque is generated in the clockwise direction in FIG. 3 in order to avoid occurrence of deflection, on a conveyance route, of the recording medium M currently conveyed. On the other hand, in a case of conveying the recording medium M in the sub-scanning reverse direction C (rewind conveyance), the conveyance roller 33 and the sheet feeding roller 31 are rotated in a clockwise direction in FIG. 3. At this point, a rotational speed of the winding roller 35 is controlled so that torque is generated in the clockwise direction in FIG. 3 in order to avoid occurrence of deflection, on the conveyance route, of the recording medium M currently conveyed.

Rotation of the sheet feeding roller 31 is controlled based on an encoder value generated by a sheet feeding encoder sensor 36 provided at the sheet feeding roller 31, to detect a mark on an encoder sheet 37. Additionally, rotation of the winding roller 35 is controlled based on an encoder value generated by a winding encoder sensor 38 provided on the winding roller 35, to detect a mark on an encoder sheet 39. Furthermore, a roll diameter (sheet feeding roll diameter) on the sheet feeding roller 31 side can be calculated by using an encoder value output from the sheet feeding encoder sensor 36, and a roll diameter (winding roll diameter) on the winding roller 35 side can also be calculated by using an encoder value output from the winding encoder sensor 38. FIG. 3 illustrates a state in which the sheet feeding roll diameter is large and the winding roll diameter is small.

The recording medium M is bit into the conveyance roller 33, generating a grip force, with which the recording medium M is conveyed. When the recording medium M is largely bit into the conveyance roller 33, an apparent roller diameter of the conveyance roller 33 becomes small. Conversely, when the recording medium M is slightly bit into the conveyance roller 33, the apparent roller diameter of the conveyance roller 33 becomes larger. Therefore, even when a rotation amount of the conveyance roller 33 is the same, a conveyance amount in the case where the recording medium M is slightly bit is larger than a conveyance amount in the case where the recording medium M is largely bit.

The degree by which the recording medium M is bit into the conveyance roller 33 is varied depending on the sheet feeding roll diameter and the conveyance roll diameter. In a case of conveying the recording medium M in the sub-scanning direction B, the smaller the winding roll diameter is and the larger the sheet feeding roll diameter is, the less the recording medium M is bit into the conveyance roller 33. As a result, a conveyance amount of the recording medium M is increased. On the other hand, in a case of conveying the recording medium M in the sub-scanning reverse direction C, the smaller the winding roll diameter is and the larger the sheet feeding roll diameter is, the more the recording medium M is bit into the conveyance roller 33 in a manner opposite to the case of conveying the recording medium M in the sub-scanning direction B. As a result, the conveyance amount of the recording medium M is reduced. Furthermore, a difference is caused in the degree of biting of the recording medium M into the conveyance roller 33 by a type of the recording medium M.

Since the recording medium M is conveyed in the sub-scanning direction B at the time of image formation on the recording medium M as described above, high accuracy is desired in controlling the conveyance amount of the recording medium M in the sub-scanning direction B. Therefore, when the recording medium M is conveyed in the sub-scanning direction B, the rotation amount of the conveyance roller 33 is adjusted in accordance with the sheet feeding roll diameter and the type of the recording medium M so as to keep the conveyance amount of the recording medium M constant.

On the other hand, generally, accurate alignment is not required in conveyance (rewind conveyance) of the recording medium M in the sub-scanning reverse direction C as in image formation, and the conveyance amount of the recording medium M is not necessarily controlled with high accuracy. However, accurate alignment is required at the time of performing colorimetry of a colorimetric pattern by rewinding and conveying the recording medium M, and the conveyance amount of the recording medium M is to be controlled with high accuracy. Here, as for conveyance amount error of the recording medium M in accordance with the sheet feeding roll diameter and the conveyance roll diameter, the conveyance amount error in conveyance in the sub-scanning direction B has a characteristic opposite to that in conveyance in the sub-scanning reverse direction C as described above. Therefore, the control performed in conveyance in the sub-scanning direction B is not applied as is to the control in conveyance in the sub-scanning reverse direction C. Additionally, when accurate control of the conveyance amount of the recording medium M is tried individually for the conveyance in the sub-scanning direction B and the conveyance in the sub-scanning reverse direction C, control becomes complicated.

Therefore, in the present embodiment, at the time of performing colorimetry of a colorimetric pattern on the recording medium M, the recording medium M having the colorimetric pattern and a marker pattern formed thereon is conveyed in the sub-scanning reverse direction C by an extra distance including an error in the conveyance amount. After that, the marker pattern is detected by the imaging unit 20 while conveying the recording medium M in the sub-scanning direction B, and the recording medium M is conveyed in the sub-scanning direction B with reference to the position where the marker pattern is detected. Then, the colorimetric pattern and the imaging unit 20 are aligned. Consequently, alignment between the colorimetric pattern and the imaging unit 20 can be performed with high accuracy and colorimetry of the colorimetric pattern can be appropriately performed without controlling the conveyance amount of the recording medium M with high accuracy during conveyance in the sub-scanning reverse direction C.

Note that, in the present embodiment, it is assumed that a metal roller is used for the above-described conveyance roller 33. The metal roller obtains grip force at the time of conveyance by making a recording medium M be bit into a mountain of the roller, however; a conveyance amount error is caused by a difference in the degree of biting of the recording medium M as described above. On the other hand, when a ceramic roller or a rubber roller is used for the conveyance roller 33, conveyance amount errors are not caused by the difference in the degree of biting of the recording medium M into the conveyance roller 33. However, there may be a case where the recording medium M slips on the conveyance roller 33 depending on the sheet feeding roll diameter and the conveyance roll diameter, resulting in a similar conveyance amount error. Therefore, the present embodiment is effective not only in the case of using the metal roller but also in the case of using the ceramic roller or the rubber roller for the conveyance roller 33.

Figure 4:
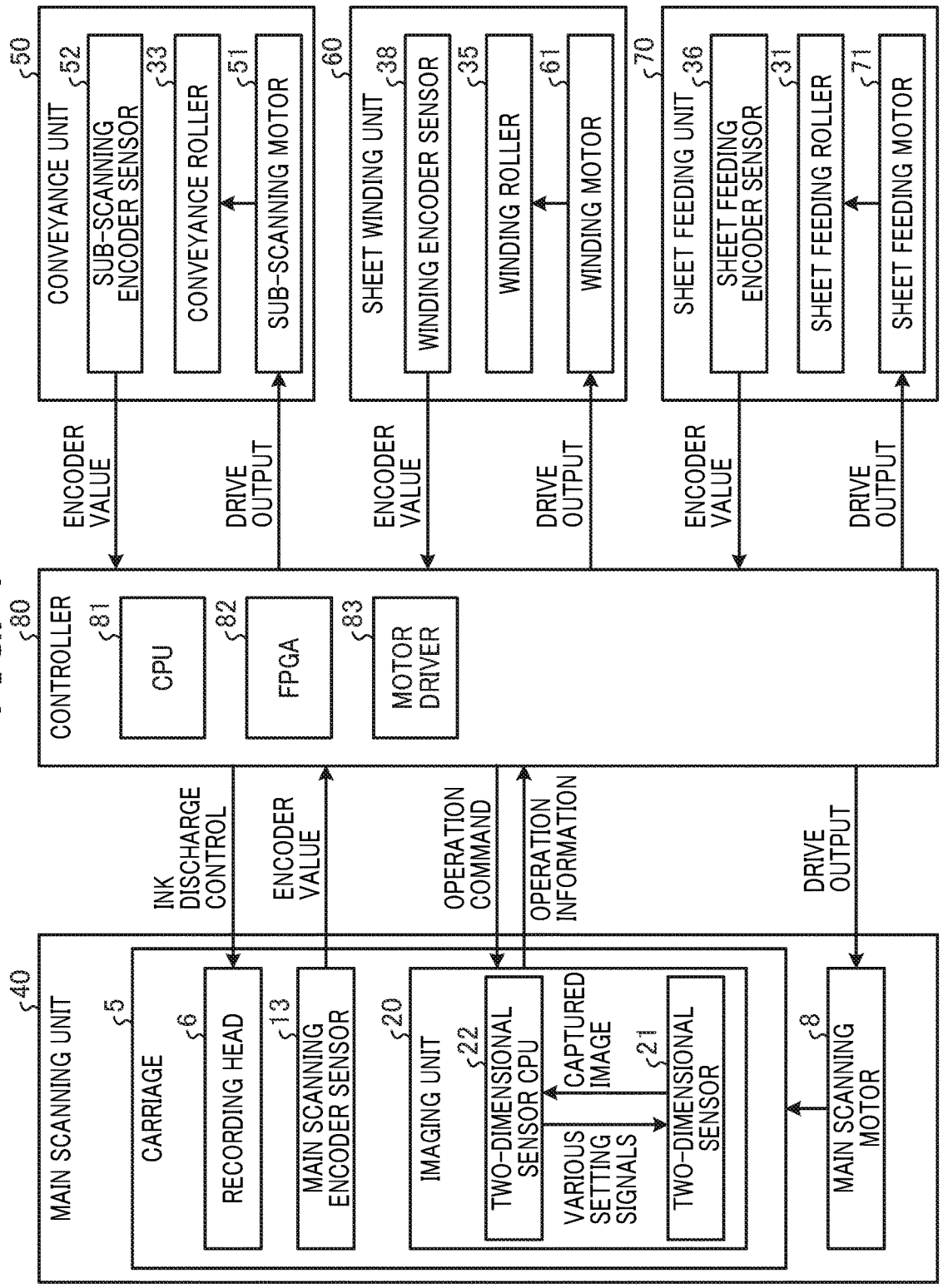
FIG. 4 is a block diagram illustrating a schematic configuration of a control mechanism of the image forming apparatus.

Next, a configuration of a control mechanism of the image forming apparatus 100 according to the present embodiment will be described with reference to FIG. 4. FIG. 4 is a block diagram schematically illustrating the configuration of the control mechanism of the image forming apparatus 100. As illustrated in FIG. 4, the image forming apparatus 100 according to the present embodiment includes a main scanning unit 40, a conveyance unit 50, a sheet winding unit 60, a sheet feeding unit 70, and a controller 80.

The main scanning unit 40 includes the carriage 5 and the main scanning motor 8 to drive the carriage 5. As described above, the recording head 6, the main-scanning encoder sensor 13, and the imaging unit 20 are mounted on the carriage 5. The imaging unit 20 includes a two-dimensional sensor 21 that is a color image sensor using a solid-state imaging device, a two-dimensional sensor central processing unit (CPU) 22 to control operation of the two-dimensional sensor 21 and process image data output from the two-dimensional sensor 21. Particularly, the two-dimensional sensor CPU 22 has a function to calculate a colorimetric value of a colorimetric pattern by using the image data output from the two-dimensional sensor 21 at the time of colorimetry of the colorimetric pattern. An example method of calculating a colorimetric value of a colorimetric pattern by the two-dimensional sensor CPU 22 is disclosed in U.S. Pat. No. 9,347,873-B2, which is hereby incorporated by reference herein.

The conveyance unit 50 includes the above-described conveyance roller 33, a sub-scanning motor 51 to drive the conveyance roller 33, and a sub-scanning encoder sensor 52 to output an encoder value in accordance with a rotation amount of the conveyance roller 33.

The sheet winding unit 60 includes the winding roller 35, a winding motor 61 to drive the winding roller 35, and the winding encoder sensor 38 to output an encoder value in accordance with a rotation amount of the winding roller 35.

The sheet feeding unit 70 includes the above-described sheet feeding roller 31, a sheet feeding motor 71 to drive the sheet feeding roller 31, and the sheet feeding encoder sensor 36 to output an encoder value in accordance with a rotation amount of the sheet feeding roller 31.

The controller 80 includes a CPU 81, a field-programmable gate array (FPGA) 82, and a motor driver 83. The controller 80 controls various kinds of operation of the image forming apparatus 100 by using the CPU 81, FPGA 82, and motor driver 83. For example, the controller 80 controls movement of the carriage 5 by controlling operation of the main scanning motor 8 based on an encoder value output from the main-scanning encoder sensor 13. Additionally, the controller 80 controls conveyance of the recording medium M by controlling: operation of the sub-scanning motor 51 based on an encoder value output from the sub-scanning encoder sensor 52; operation of the winding motor 61 based on an encoder value output from the winding encoder sensor 38; and operation of the sheet feeding motor 71 based on an encoder value output from the sheet feeding encoder sensor 36. Furthermore, the controller 80 controls ink discharge from the recording head 6 mounted on the carriage 5 and also controls movement of the carriage 5 and conveyance of the recording medium M, thereby forming a desired image on a recording medium M. Additionally, the controller 80 has various control functions in accordance with purposes.

In the image forming apparatus 100 according to the present embodiment, the conveyance unit 50, the sheet winding unit 60, the sheet feeding unit 70, and the controller 80 correspond to "conveyance device" to convey the recording medium M. The conveyance device of the image forming apparatus 100 can convey the recording medium M in both of the sub-scanning direction B and the sub-scanning reverse direction C under the control of the controller 80.

Additionally, in the image forming apparatus 100 according to the present embodiment, the recording head 6 mounted on the carriage 5 and the controller 80 correspond to "image forming device" to form an image on the recording medium M. The image forming device of the image forming apparatus 100 forms a marker pattern and a colorimetric pattern on the recording medium M at the time of performing calibration such as color adjustment. The marker pattern is used to identify a position of a colorimetric pattern. The colorimetric pattern is formed at a position apart from the marker pattern by a predetermined distance in the sub-scanning direction B. In other words, after the marker pattern is formed, the colorimetric pattern is formed on the recording medium M conveyed by the conveyance device by a predetermined distance in the sub-scanning direction B.

Additionally, in the image forming apparatus 100 according to the present embodiment, the imaging unit 20 mounted on the carriage 5 corresponds to "imaging device" to capture an image of a colorimetric pattern on a recording medium M. As described above, the imaging unit 20 has the function to detect a marker pattern on the recording medium M and the function to calculate a colorimetric value of the colorimetric pattern by using captured image data of the colorimetric pattern.

Figure 5:
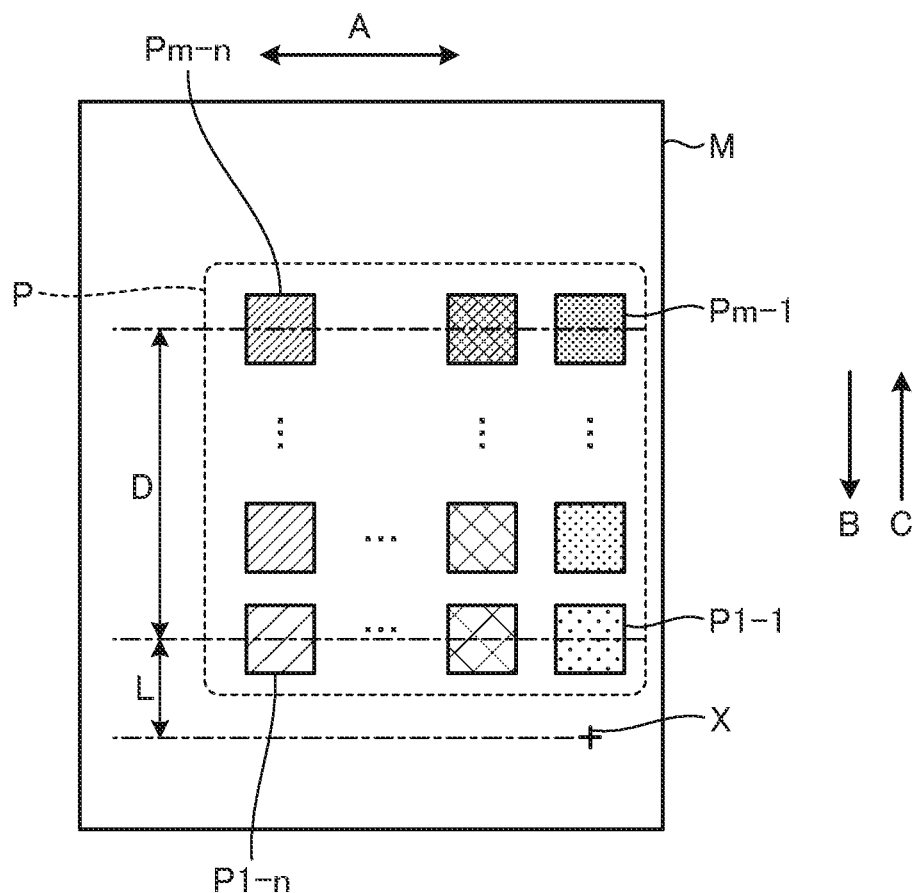
FIG. 5 is a diagram illustrating an exemplary image formed on a recording medium at the time of calibration of the image forming apparatus.

FIG. 5 is a diagram illustrating an exemplary image formed on a recording medium M in the image forming apparatus 100 at the time of calibration. For example, as illustrated in FIG. 5, the image forming apparatus 100 forms a colorimetric pattern P and a marker pattern X on the recording medium M at the time of performing calibration such as color adjustment, and the colorimetric pattern includes m rows×n columns constituted of the patch groups including patches P1-1 to Pm-n. A first row includes patches P1-1 to P1-$n$, and a first column includes patches P1-1 to Pm-1.

A patch center of the m-th row is at a distance D from a patch center of the first row. The marker pattern X is at a predetermined distance L [mm] from the patch center of the first row in the sub-scanning direction B and is overlapping in the main scanning direction A with the first column (including the patch P1-1) to be subjected to first colorimetry. For example, the distance L is preliminarily determined by a manufacturer of the image forming apparatus 100 and stored in a memory. The distance L corresponds to the distance by which the recording medium M is conveyed after formation of the marker pattern X and before formation of the colorimetric pattern P.

Next, conveyance control for a recording medium M at the time of colorimetry of a colorimetric pattern P on the recording medium M will be described in detail. The image forming apparatus 100 according to the present embodiment conveys, in the sub-scanning direction B, the recording medium M bearing the marker pattern X and the colorimetric pattern P and performs the drying process with the drying heater 17. After the colorimetric pattern P is dried in the drying process, the recording medium M is conveyed in the sub-scanning reverse direction C to a position where the imaging unit 20 can detect the marker pattern X. At this point, the recording medium M is conveyed in the sub-scanning reverse direction C by an extra distance considering the conveyance amount error.

Although, in the image forming apparatus 100 according to the present embodiment, the recording medium M bearing the marker pattern X and the colorimetric pattern P is conveyed in the sub-scanning direction B and dried by the drying heater 17, alternatively, the colorimetric pattern P can be dried by natural drying. In this case, the recording medium M bearing the marker pattern X and the colorimetric pattern P is not conveyed in the sub-scanning direction B but is kept at that position until the colorimetric pattern P dries. Then, after the colorimetric pattern P dries, the recording medium M is conveyed in the sub-scanning reverse direction C up to the position where the imaging unit 20 can detect the marker pattern X.

Figure 6:
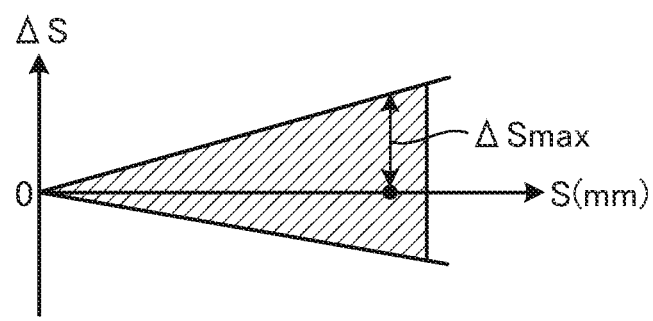
FIG. 6 is a diagram illustrating a conveyance amount error in conveying the recording medium in reverse to a sub-scanning direction (conveyance in a sub-scanning reverse direction)

FIG. 6 is a diagram illustrating a conveyance amount error in reverse conveyance of the recording medium M. A conveyance amount error $\Delta S$ can be defined as "target conveyance amount S minus actual conveyance amount Sa (S−Sa)". The target conveyance amount S used in the present disclosure means the conveyance amount corresponding to the distance by which the recording medium M is conveyed back in the sub-scanning direction B.

A possible range (shaded area in FIG. 6) of the conveyance amount error $\Delta S$ increases in proportion to the target conveyance amount S. An inclination of the possible range of the conveyance amount error $\Delta S$ varies by the type of the recording medium M. When the conveyance amount error $\Delta S$ is a plus value, the actual conveyance amount is insufficient relative to the target conveyance amount S. Conversely, when the conveyance amount error $\Delta S$ is a minus value, the actual conveyance amount Sa is larger than the target conveyance amount S. In the present embodiment, a maximum value of possible error amount $\Delta S$ on plus-side (hereinafter "maximum plus-side error amount $\Delta Smax$") is set to a conveyance amount margin.

Note that the maximum plus-side error amount $\Delta Smax$ in accordance with the target conveyance amount S varies depending on the type of the recording medium M. Therefore, preferably, data such as a calculation formula and a table for calculating the maximum plus-side error amount $\Delta Smax$ in accordance with the target conveyance amount S is preliminarily stored per recording medium type in a memory and, for example, the CPU 81 of the controller 80 calculates, based on the data, the conveyance amount margin in accordance with recording medium type and the target conveyance amount S.

In the present embodiment, when the recording medium M is conveyed in the sub-scanning reverse direction C after the colorimetric pattern P is dried in the drying process, the recording medium M is conveyed by a distance obtained by adding the conveyance amount margin to the target conveyance amount S instead of performing complex control of the conveyance amount. The target conveyance amount S is a conveyance amount corresponding to the distance from the marker pattern X on the recording medium M and the imaging unit 20 (center of an imaging range by the imaging unit 20) before the recording medium is conveyed in the sub-scanning reverse direction C.

Figure 7:
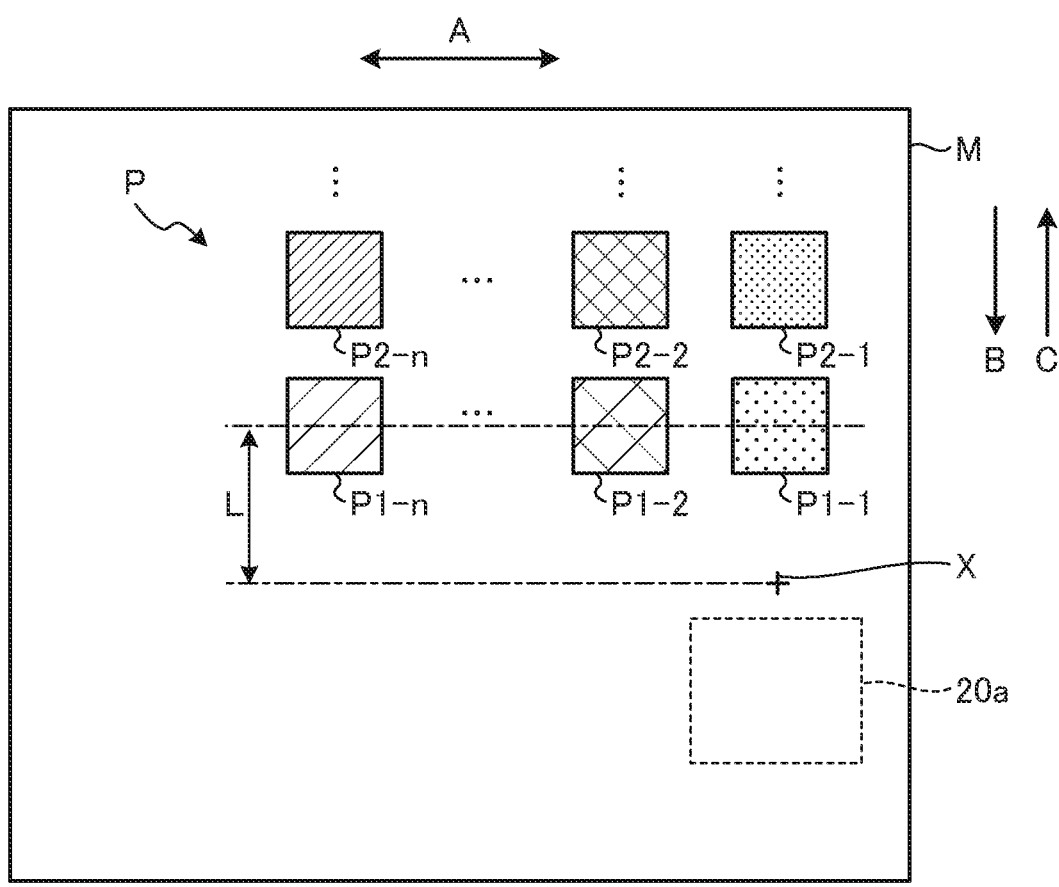
FIG. 7 is a diagram illustrating a positional relation between a marker pattern and a colorimetric pattern on a recording medium and an imaging range of an imaging unit according to an embodiment, after conveyance of the recording medium in the sub-scanning reverse direction.

FIG. 7 is a diagram illustrating a positional relation between the marker pattern X and the colorimetric pattern P on the recording medium M and an imaging range 20a (i.e., an imaging position and a colorimetry position) of an imaging unit 20 after conveyance of the recording medium in the sub-scanning reverse direction C. Since the recording medium M is conveyed in the sub-scanning reverse direction C by the distance obtained by adding the conveyance amount margin to the target conveyance amount S, the marker pattern X is positioned on the upstream side of the imaging range 20a of the imaging unit 20 as illustrated in FIG. 7.

As described above, according to the present embodiment, after conveying the recording medium M in the sub-scanning reverse direction C, the image forming apparatus 100 performs alignment in the main scanning direction A. Specifically, the image forming apparatus 100 adjusts the position of the carriage 5 so that the imaging unit 20 overlaps, in the main scanning direction A, with the patch P1-1 to be colorimetrically measured first in the colorimetric pattern P. Then, while the recording medium M is conveyed in the sub-scanning direction B, an image of the recording medium M is captured by the imaging unit 20 to detect the marker pattern X. In other words, for example, the controller 80 determines whether the image captured by the imaging unit 20 contains the marker pattern X. In a case where the marker pattern X is not contained, the recording medium M is conveyed in the sub-scanning direction B by the distance corresponding to the imaging range 20a of the imaging unit 20 to perform imaging again by the imaging unit 20. This processing is repeated until the marker pattern X appears in the image captured by the imaging unit 20. Since the imaging unit 20 is mounted on the carriage 5 and kept at the constant distance from the recording medium M, the distance corresponding to the imaging range 20a of the imaging unit 20 is a fixed value assuming that a thickness of the recording medium M can be ignored.

When the marker pattern X is detected by the imaging unit 20, the image forming apparatus 100 according to the present embodiment calculates the distance from the imaging unit 20 to the patch P1-1, which is colorimetrically measured first in the colorimetric pattern P, based on the position of the marker pattern X on the image captured by the imaging unit 20 and the distance L on the recording medium M (between the marker pattern X and the patch center of the first row of the colorimetric pattern P). Then, the recording medium M is conveyed in the sub-scanning direction B by the calculated distance.

Figure 8:
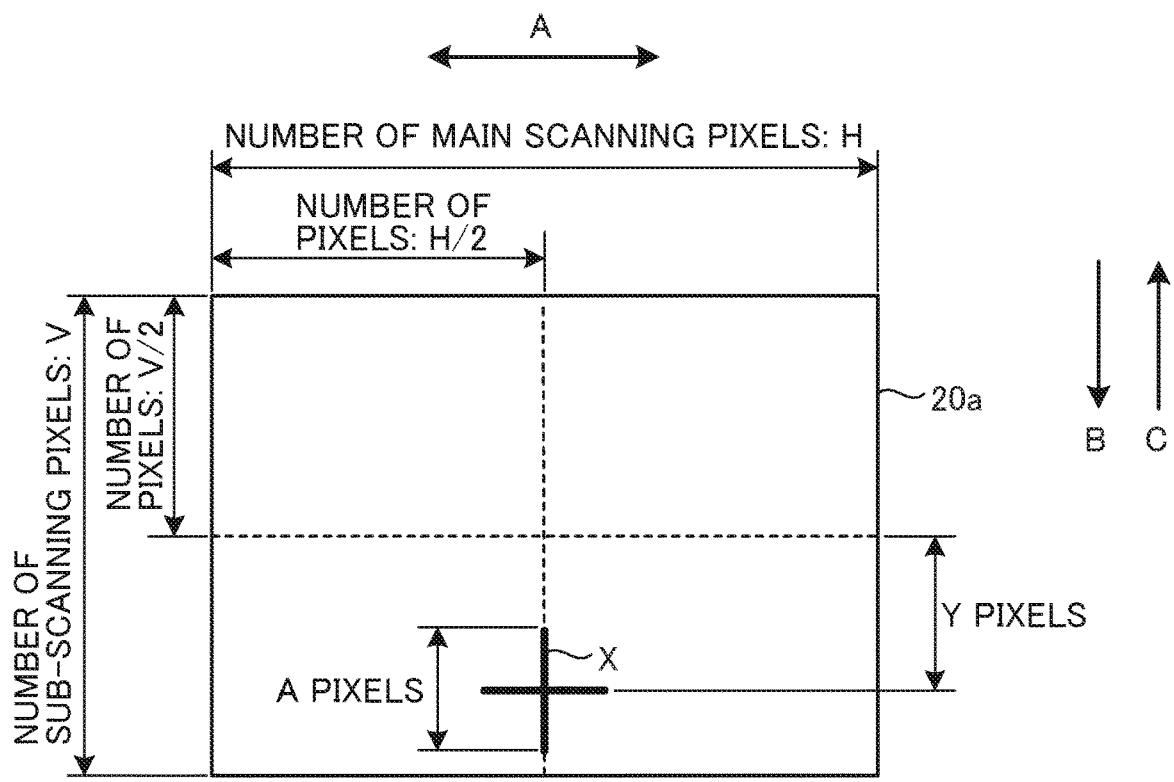
FIG. 8 is a diagram illustrating an example of a marker pattern on an image captured by the imaging unit.

FIG. 8 is a diagram illustrating an example of a marker pattern X on an image captured by the imaging unit 20. When the marker pattern X is detected with the imaging unit 20, the controller 80 calculates the number of pixels (Y pixels) by which the center of the marker pattern X is deviated from the center of the the imaging range 20a in the sub-scanning direction (indicated by arrow B or C) as illustrated in FIG. 8. Here, since a length a [mm] in the sub-scanning direction of the marker pattern X on the recording medium M is already known, a distance α (mm) per pixel of the image can be correctly calculated by α=a/Z [mm] from a length in the sub-scanning direction (Z pixels) of the marker pattern X on the image captured by the imaging unit 20. Then, a distance Y×α [mm] between the marker pattern X on the recording medium M and the center of the imaging range 20a of the imaging unit 20 can be calculated from the value of Y and the value of α.

Since the imaging unit 20 is mounted on the carriage 5 and kept at the constant distance from the recording medium M as described above, alternatively, an approximate value of the distance α per pixel of the image can be calculated in advance. With use of the approximate value of the distance α, calculation of the accurate distance α can be omitted.

Here, in a case where the marker pattern X is deviated from the center of the imaging range 20a of the imaging unit 20 in the sub-scanning direction B, the distance from the imaging unit 20 to the patch P1-1 to be colorimetrically measured first in the colorimetric pattern P is L−Y×α [mm]. Conversely, in a case where the marker pattern X is deviated from the center of the imaging range 20a of the imaging unit 20 in the sub-scanning reverse direction C, the distance from the imaging unit 20 to the patch P1-1 to be colorimetrically measured first in the colorimetric pattern P is L+Y×α [mm].

After the marker pattern X is detected by the imaging unit 20, the image forming apparatus 100 according to the present embodiment conveys the recording medium M in the sub-scanning direction B by the distance (L−y×α [mm] or L+y×α [mm]) calculated as described above. Thus, alignment between the colorimetric pattern P and the imaging unit 20 can be performed with high accuracy. Then, an image of the colorimetric pattern P is captured by the imaging unit 20 at this position, and a colorimetric value of the colorimetric pattern P can be appropriately calculated by using the image data.

Figure 9:
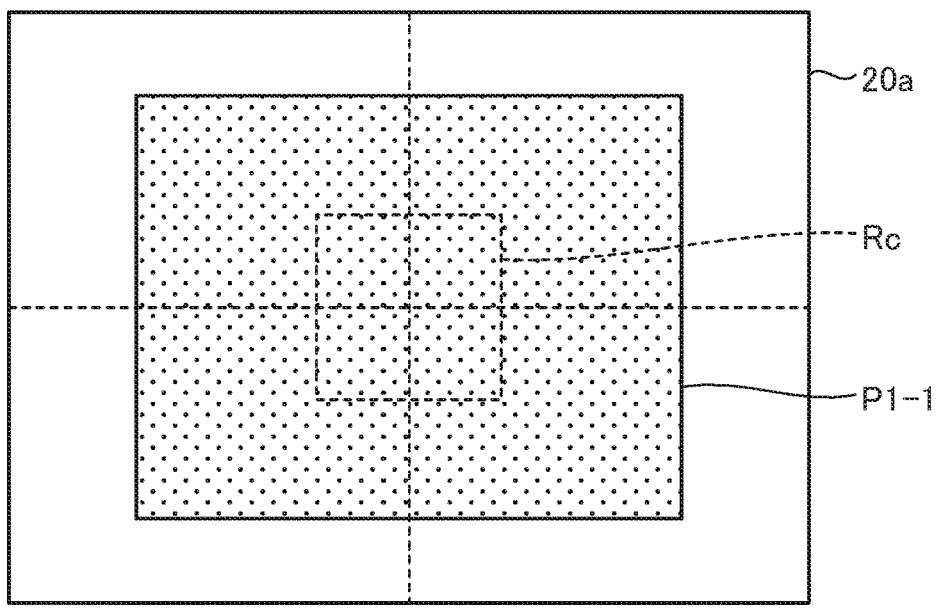
FIG. 9 is a diagram illustrating a state in which a patch to be subjected to first colorimetry in a colorimetric pattern is captured by the imaging unit.

FIG. 9 is a diagram illustrating a state in which an image of the patch P1-1 to be colorimetrically measured first in the colorimetric pattern P is captured by the imaging unit 20. As illustrated in FIG. 9, for example, the two-dimensional sensor CPU 22 of the imaging unit 20 calculates a colorimetric value of the patch P1-1 by using image data (RGB value) of a predetermined region Rc in the vicinity of the center of the imaging range 20a in the image data output from the two-dimensional sensor 21.

When colorimetry of the patch P1-1 (to be colorimetrically measured first in the colorimetric pattern P) is finished, the image forming apparatus 100 sequentially moves the carriage 5 in the main scanning direction A and conveys the recording medium M in the sub-scanning direction B, to move the imaging unit 20 to another patch. Then, an image of each patch is captured by the imaging unit 20 in a state in which the patch is located at the center of the imaging range 20a of the imaging unit 20, and a colorimetric value of each patch is calculated.

Figure 10:
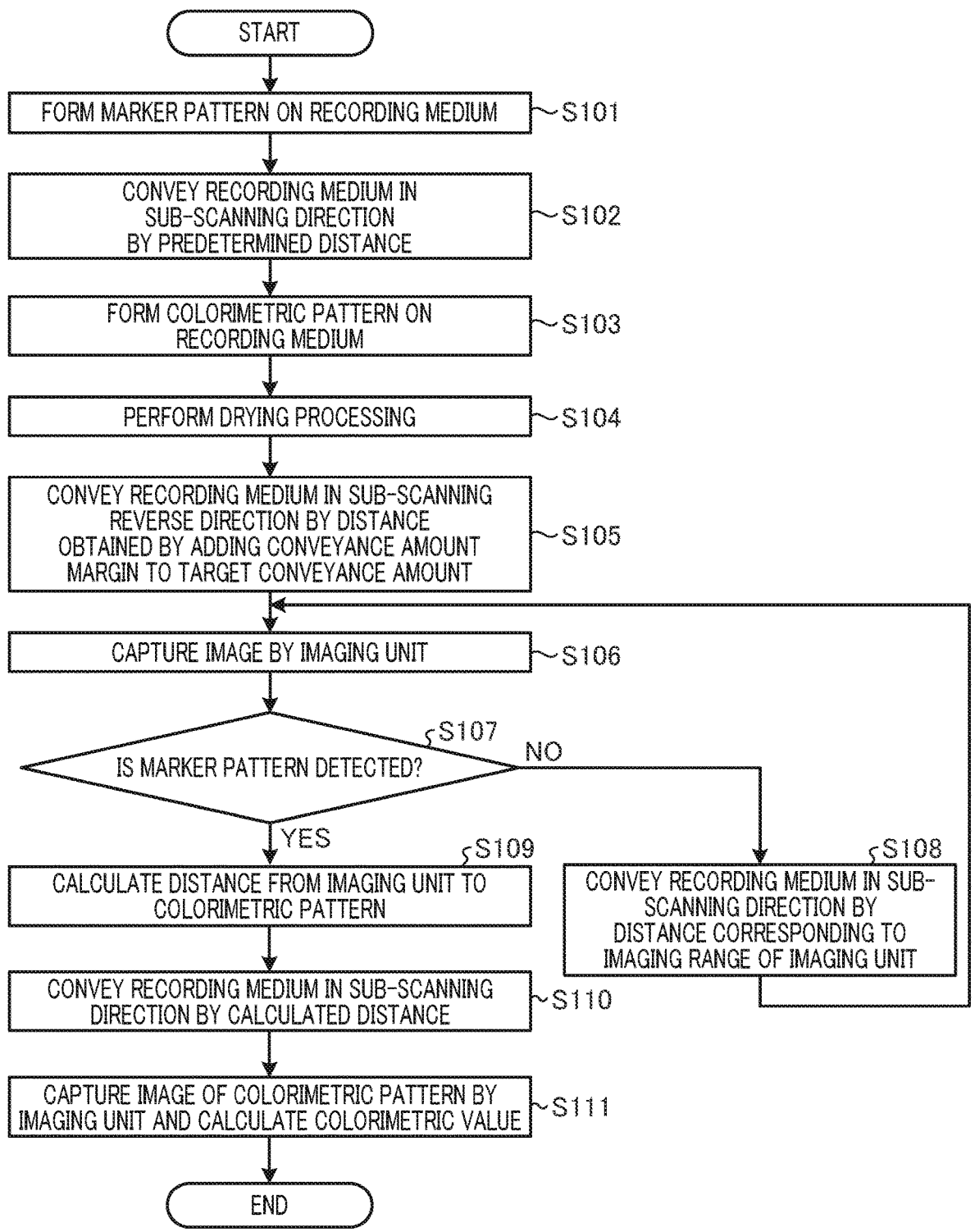
FIG. 10 is a flowchart illustrating a procedure of processing executed by the image forming apparatus at the time of calibration.

Next, exemplary operation of the image forming apparatus 100 according to the present embodiment at the time of calibration will be described with reference to FIG. 10. FIG. 10 is a flowchart illustrating a procedure of processing executed by the image forming apparatus 100 at the time of calibration.

First, the image forming apparatus 100 forms the marker pattern X on a recording medium M (step S101). After that, the image forming apparatus 100 conveys the recording medium M in the sub-scanning direction B by the predetermined distance L (step S102) and forms the colorimetric pattern P on the recording medium M (step S103). Then, when formation of the colorimetric pattern P is finished, the image forming apparatus 100 dries the colorimetric pattern P in the drying process (step S104). In a case where the drying heater 17 is used in the drying process, the recording medium M is conveyed in the sub-scanning direction B. In a case where the colorimetric pattern P is dried by natural drying, the recording medium M is kept at the position where formation of the colorimetric pattern P is finished until the colorimetric pattern P dries.

When the colorimetric pattern P on the recording medium M is dried in the drying process, the image forming apparatus 100 conveys the recording medium M in the sub-scanning reverse direction C by the distance obtained by adding the conveyance amount margin to the target conveyance amount S (step S105). Subsequently, alignment of the imaging unit 20 in the main scanning direction A is performed and an image of the recording medium M is captured by the imaging unit 20 (step S106). Then, the controller 80 determines whether the marker pattern X is detected (step S107). Here, in a case where no marker pattern X is detected (step S107: No), the recording medium M is conveyed in the sub-scanning direction B by a distance corresponding to the imaging range 20a of the imaging unit 20 (step S108), and the processing returns to step S106 and the imaging unit 20 captures an image again.

In a case where the marker pattern X is detected (step S107: Yes), the distance from the imaging unit 20 to the colorimetric pattern P is calculated based on: the position of the marker pattern X on the image captured by the imaging unit 20; and the distance L between the marker pattern X and the colorimetric pattern P (patch center of the first row) on the recording medium M (step S109). Then, the recording medium M is conveyed in the sub-scanning direction B by the distance calculated in step S109 (step S110), to the colorimetry position.

When the imaging unit 20 and the colorimetric pattern P are aligned with the conveyance of the recording medium M in step S110, the imaging unit 20 sequentially captures images of the patch groups including P1-1 to Pm-n in the colorimetric pattern P to calculate colorimetric values of the respective patches (step S111). Since the positional relation of the patch groups including P1-1 to Pm-n in the colorimetric pattern P is known, the carriage 5 can be moved in the main scanning direction A and the recording medium M can be conveyed in the sub-scanning direction B, to sequentially move the imaging unit 20 to positions of the respective patches.

As described above in detail with reference to specific examples, the image forming apparatus 100 according to the present embodiment forms the marker pattern X on the recording medium M, conveys the recording medium M in the sub-scanning direction B by the predetermined distance L, and then forms the colorimetric pattern P. After the colorimetric pattern P is dried in the drying process, the recording medium M is conveyed in the sub-scanning reverse direction C by the distance obtained by adding the conveyance amount margin to the target conveyance amount S. After that, while conveying the recording medium M in the sub-scanning direction B, the marker pattern X is detected by the imaging unit 20, and the recording medium M is conveyed in the sub-scanning direction B, with reference to the position where the marker pattern X is detected to align the colorimetric pattern P with the imaging unit 20. Therefore, according to the image forming apparatus 100, the colorimetric pattern P can be aligned with the imaging unit 20 with high accuracy and colorimetry of the colorimetric pattern P can be appropriately performed, obviating control, with high accuracy, of the conveyance amount of the recording medium M conveyed in the sub-scanning reverse direction C.

MODIFIED EXAMPLE 1

Although, in the above-described embodiment, one marker pattern X is formed on a recording medium M, alternatively, a plurality of marker patterns having different distances from a colorimetric pattern P can be formed at different positions in the sub-scanning direction on the recording medium M in order to facilitate detection of the marker pattern X after the recording medium M is conveyed in the sub-scanning reverse direction C.

Figure 11:
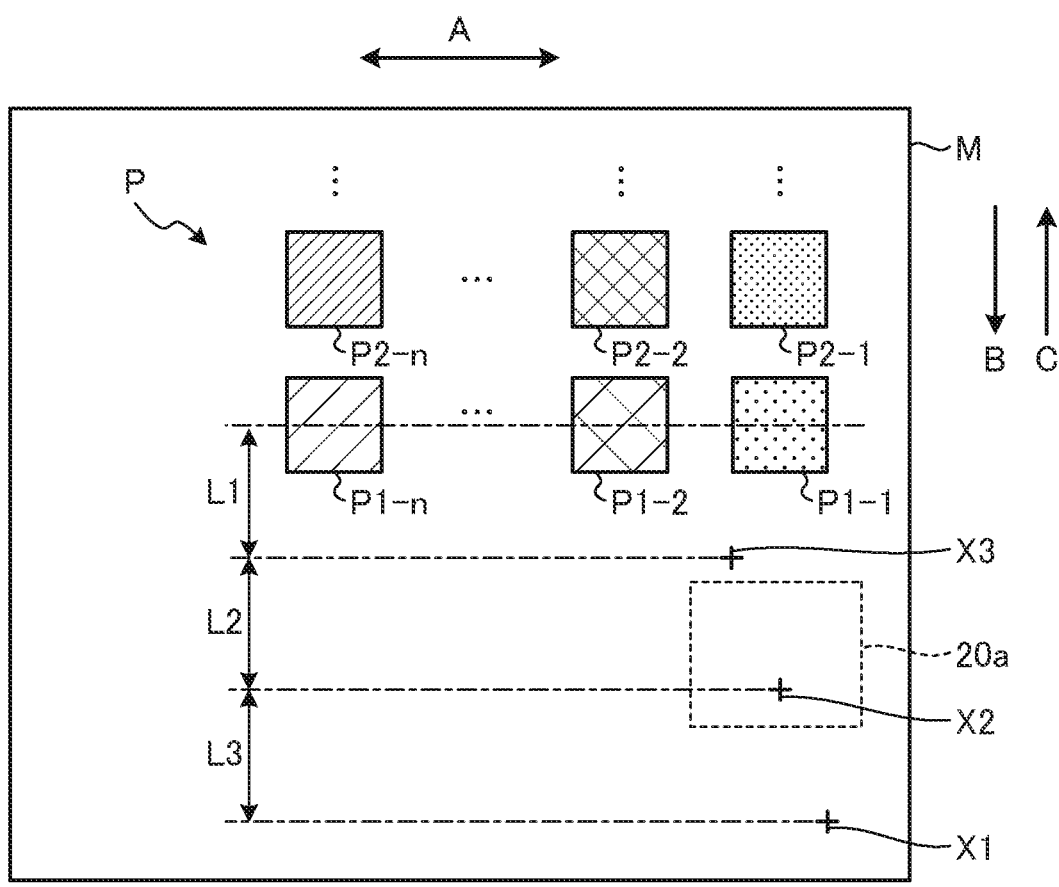
FIG. 11 is a diagram illustrating a positional relation between a marker pattern and a colorimetric pattern on a recording medium and the imaging range of the imaging unit after conveyance of the recording medium in the sub-scanning reverse direction.
Figure 12:
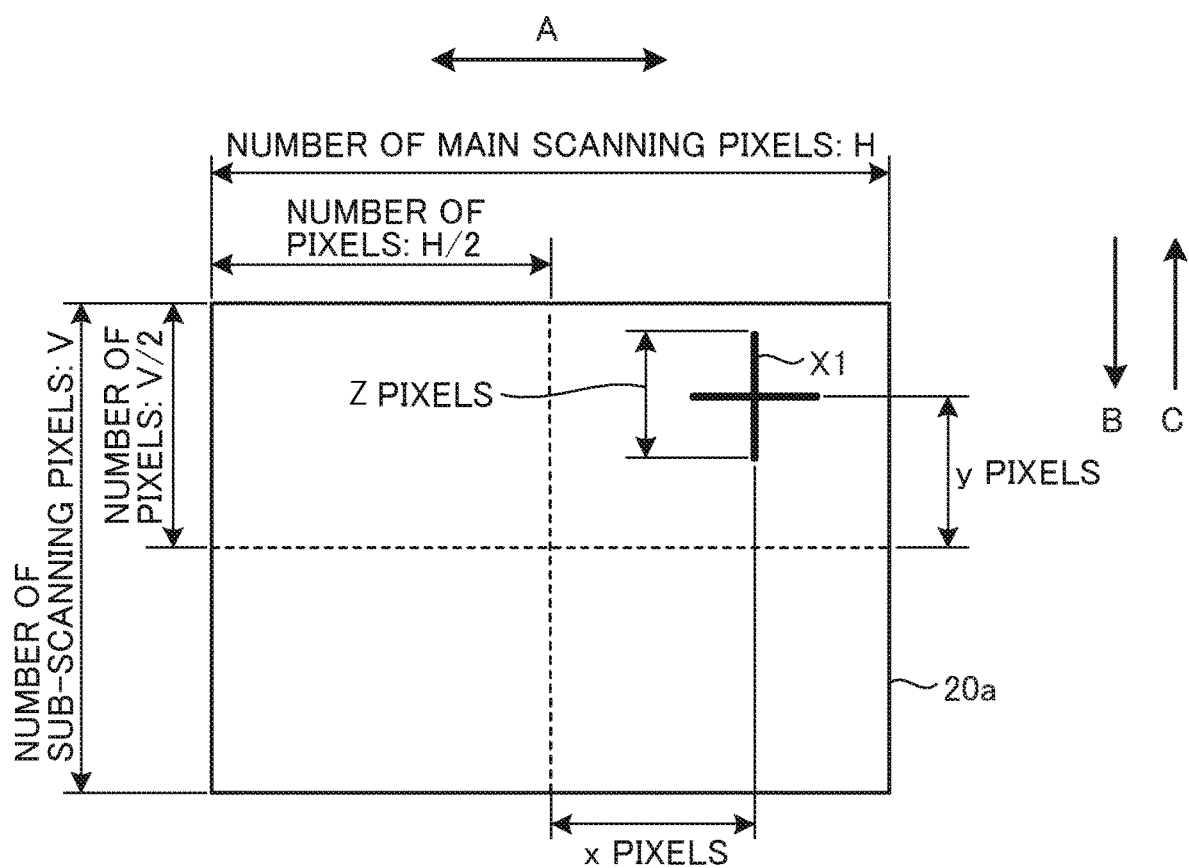
FIG. 12 is a diagram illustrating an example of a marker pattern on an image captured by the imaging unit.

FIGS. 11 and 12 are diagrams illustrating the present modified example. FIG. 11 is a diagram illustrating a plurality of marker patterns X and a colorimetric pattern P on a recording medium M and an imaging range 20a of the imaging unit 20 after conveying the recording medium in the sub-scanning reverse direction C, and FIG. 12 is a diagram illustrating an example of a marker pattern X on an image captured by the imaging unit 20.

In the present modified example, as illustrated in FIG. 11, for example, a marker pattern X3 is formed at a predetermined distance L1 [mm] from a patch center of a first row of a colorimetric pattern P in the sub-scanning direction B, a marker pattern X2 is formed at a predetermined distance L2 [mm] from a center of the marker pattern X3, and a marker pattern X1 is formed at a predetermined distance L3 [mm] from a center of the marker pattern X2, respectively. Additionally, the marker patterns X1 to X3 are formed as follows. The center of the marker pattern X2 overlaps, in the main scanning direction A, with the center of the patch P1-1 to be colorimetrically measured first, the marker pattern X1 is on a side of the marker pattern X2 in the main scanning direction A, and the marker pattern X3 is on the other side in the main scanning direction A.

At this time, in the main scanning direction A, a distance between the marker pattern X1 and the marker pattern X2 and a distance between the marker pattern X3 and the marker pattern X2 are shorter than a half of the length of the imaging range 20a of the imaging unit 20 (half of the number of main scanning pixels H (H/2) of the captured image). Additionally, in the sub-scanning direction (sub-scanning direction B or sub-scanning reverse direction C), a distance between the marker pattern X1 and the marker pattern X2 and a distance between the marker pattern X3 and the marker pattern X2 are preferably shorter than the length of the imaging range 20a of the imaging unit 20 (the number of sub-scanning pixels V in the captured image). Although the example in which the three marker patterns X1 to X3 are formed is described here, the number of marker patterns X to be formed is not limited thereto.

In the present modified example, the colorimetric pattern P is dried in the drying process, and then the recording medium M is conveyed in the sub-scanning reverse direction C in a manner similar to the above-described embodiment. At this point, a conveyance amount in accordance with the distance between the position of the marker pattern X2 on the recording medium M and the position of the imaging unit 20 before conveyance is set as the target conveyance amount S, and the recording medium M is conveyed in the sub-scanning reverse direction C by the distance obtained by adding the conveyance amount margin to the target conveyance amount S. However, in the present modified example, the range in which the marker patterns X (X1 to X3) can be detected by the imaging unit 20 is larger. Therefore, the recording medium M can be conveyed in the sub-scanning reverse direction C in accordance with the target conveyance amount S without adding the conveyance amount margin.

As described above, the recording medium M is conveyed in the sub-scanning reverse direction C, and then the position of the carriage 5 is adjusted to perform alignment of the imaging unit 20 in the main scanning direction A in a manner similar to the above-described embodiment. Then, an image of the recording medium M is captured by the imaging unit 20 to detect the marker patterns X. At this point, as illustrated in FIG. 12, for example, in a case where one marker pattern X is detected on the right of the center of the imaging range 20a on the image captured by the imaging unit 20, it is found that the detected marker pattern X is the marker pattern X1 at a distance of L1+L2+L3 [mm], in the sub-scanning direction B, from the patch center of the first row in the colorimetric pattern P. Additionally, as illustrated in FIG. 12, in a case where the marker pattern X1 is detected at a position deviated from the center of the imaging range 20a of the imaging unit 20 by y pixels in the sub-scanning reverse direction C, the distance from the imaging unit 20 to the patch P1-1 to be colorimetrically measured first in the colorimetric pattern P is L1+L2+L3+y×α [mm].

In a case where one marker pattern X is detected at the center of the imaging range 20a on the image captured by the imaging unit 20, the marker pattern X is the marker pattern X2 at distance L1+L2 [mm], in the sub-scanning direction B, from the patch center of the first row in the colorimetric pattern P. Additionally, in a case where one marker pattern X is detected on the left of the center of the imaging range 20a on the image captured by the imaging unit 20, the marker pattern X is the marker pattern X3 at the distance L1 [mm], in the sub-scanning direction B, from the patch center of the first row in the colorimetric pattern P. Then, a distance from the imaging unit 20 to the patch P1-1 can be calculated based on the position of the detected marker pattern X on the image (pixel deviation amount from the center of the imaging range 20a in the sub-scanning direction and a direction (upstream side or downstream side)) and a distance to the patch P1-1 on the recording medium M. In the case where no marker pattern X is detected by the imaging unit 20, conveyance of the recording medium M in the sub-scanning direction B and imaging by the imaging unit 20 can be repeated until any marker pattern X is detected, in a manner similar to the above-described embodiment.

In the present modified example also, a marker pattern X is detected by the imaging unit 20, and then the recording medium M is conveyed in the sub-scanning direction B by a distance calculated as described above in a manner similar to the above-described embodiment. Thus, alignment between the colorimetric pattern P and the imaging unit 20 can be performed with high accuracy. Then, an image of the colorimetric pattern P is captured by the imaging unit 20 at this position, and a colorimetric value of the colorimetric pattern P can be appropriately calculated by using the image data.

Figure 13:
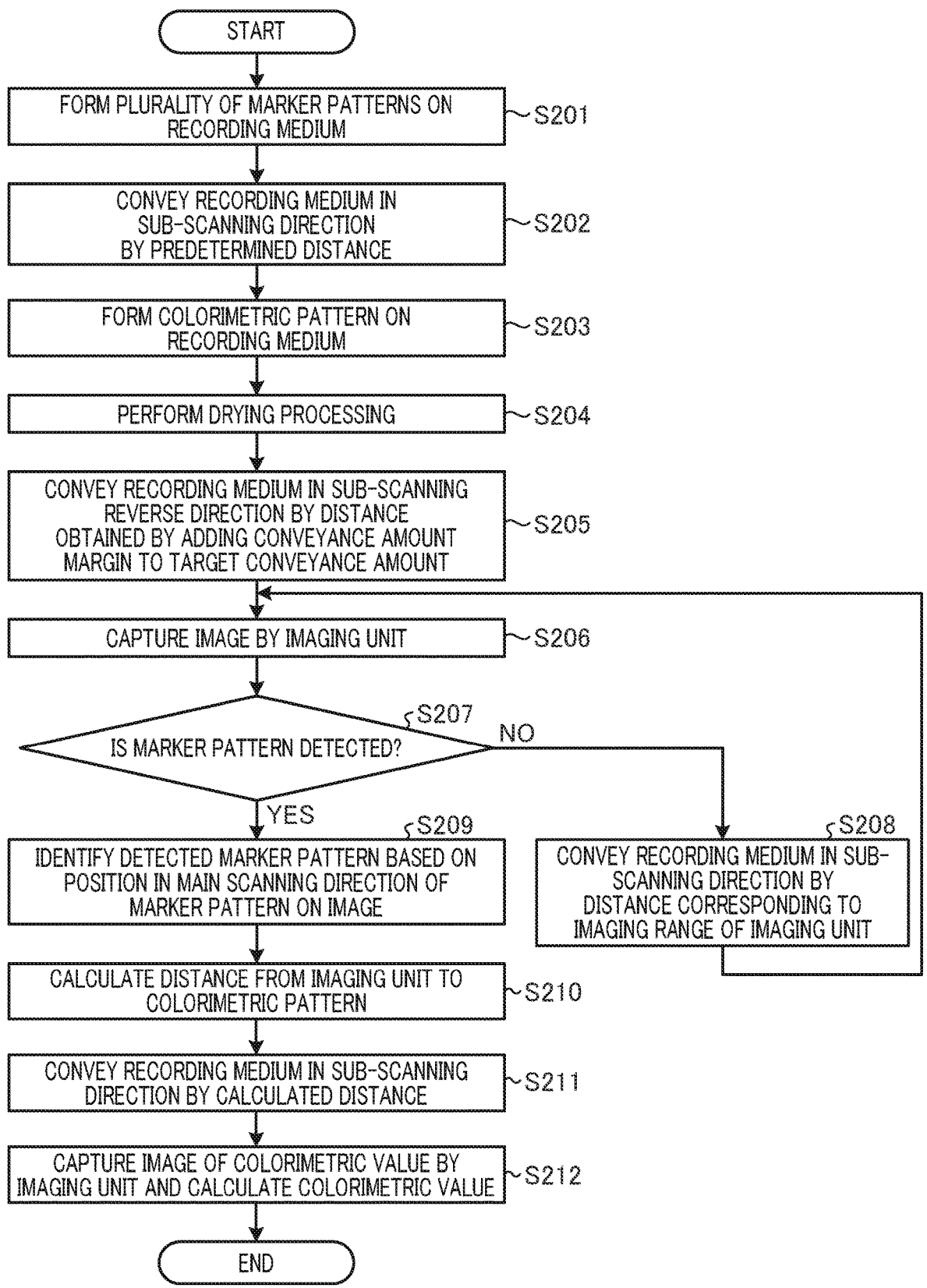
FIG. 13 is a flowchart illustrating a procedure of processing executed by the image forming apparatus at the time of calibration.

FIG. 13 is a flowchart illustrating a procedure of processing executed by the image forming apparatus 100 at the time of calibration in the present modified example.

In the image forming apparatus 100 of the present modified example, the plurality of marker patterns X1 to X3 is formed at different positions in the sub-scanning direction of a recording medium M (step S201). After that, the recording medium M is conveyed in the sub-scanning direction B by the predetermined distance L1 (step S202), and the colorimetric pattern P is formed on the recording medium M (step S203) in a manner similar to the above-described embodiment. Then, when formation of the colorimetric pattern P is finished, the image forming apparatus 100 dries, in the drying process, the colorimetric pattern P (step S204).

After that, when the colorimetric pattern P on the recording medium M is dried in the drying process, the image forming apparatus 100 conveys the recording medium M in the sub-scanning reverse direction C (step S205) to perform alignment of the imaging unit 20 in the main scanning direction A and captures an image of the recording medium M, with the imaging unit 20, while conveying the recording medium M in the sub-scanning direction B to detect one marker pattern X (steps from S206 to S208). Here, when one marker pattern X is detected (S207: Yes), the image forming apparatus 100 identifies which one of the plurality of marker patterns X1 to X3 is the detected based on the position in the main scanning direction A of the marker pattern X on the image (step S209). Then, the distance from the imaging unit 20 to the colorimetric pattern P is calculated based on the position in the sub-scanning direction of the marker pattern X on the image and the distance L (any one of L1 to L3) between the marker pattern X and the colorimetric pattern P on the recording medium M (step S210), and the recording medium M is conveyed in the sub-scanning direction B by the distance calculated in step S210 (step S211) in a manner similar to the above-described embodiment.

When alignment between the imaging unit 20 and the colorimetric pattern P is performed by conveying the recording medium M in step S211, images of the patch groups including P1-1 to Pm-n in the colorimetric pattern P are sequentially captured by the imaging unit 20 to calculate colorimetric values of the respective patches (step S212) in a manner similar to the above-described embodiment.

Like the present modified example, forming the plurality of marker patterns X (X1 to X3) having the different distances from the colorimetric pattern P at different positions in the sub-scanning direction on the recording medium M and detecting any one of the plurality of marker patterns X1 to X3 with imaging by the imaging unit 20 can facilitate detection of the marker patterns X after conveying the recording medium M in the sub-scanning reverse direction C.

Figure 14A:
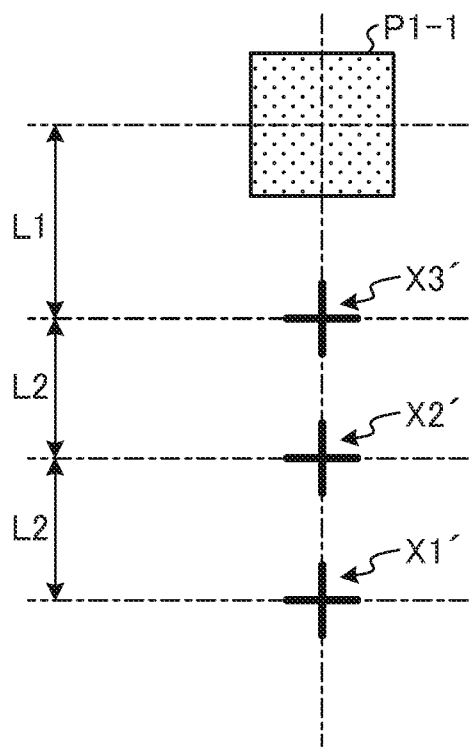
FIGS. 14A and 14B are diagrams illustrating other examples of a plurality of marker patterns.
Figure 14B:
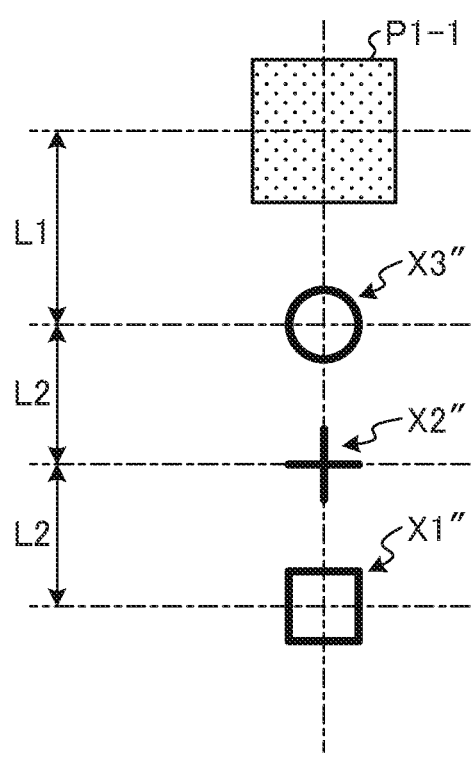

Note that, in the above description, the plurality of marker patterns X (X1 to X3) can be distinguished from each other by differences in the position in the main scanning direction A, but any form of marker patterns can be adopted as far as the plurality of marker patterns X (X1 to X3) can be distinguished from each other based on an image captured by the imaging unit 20. For example, as illustrated in FIG. 14A, a plurality of marker patterns X1' to X3' having different colors can be formed on a recording medium M so that these marker patterns X1' to X3' can be distinguished from each other by the color differences. Additionally, as illustrated in FIG. 14B, a plurality of marker patterns X1" to X3" having different shapes can also be formed on a recording medium M so that these marker patterns X1" to X3" can be distinguished from each other by the shape differences.

MODIFIED EXAMPLE 2

Figure 16:
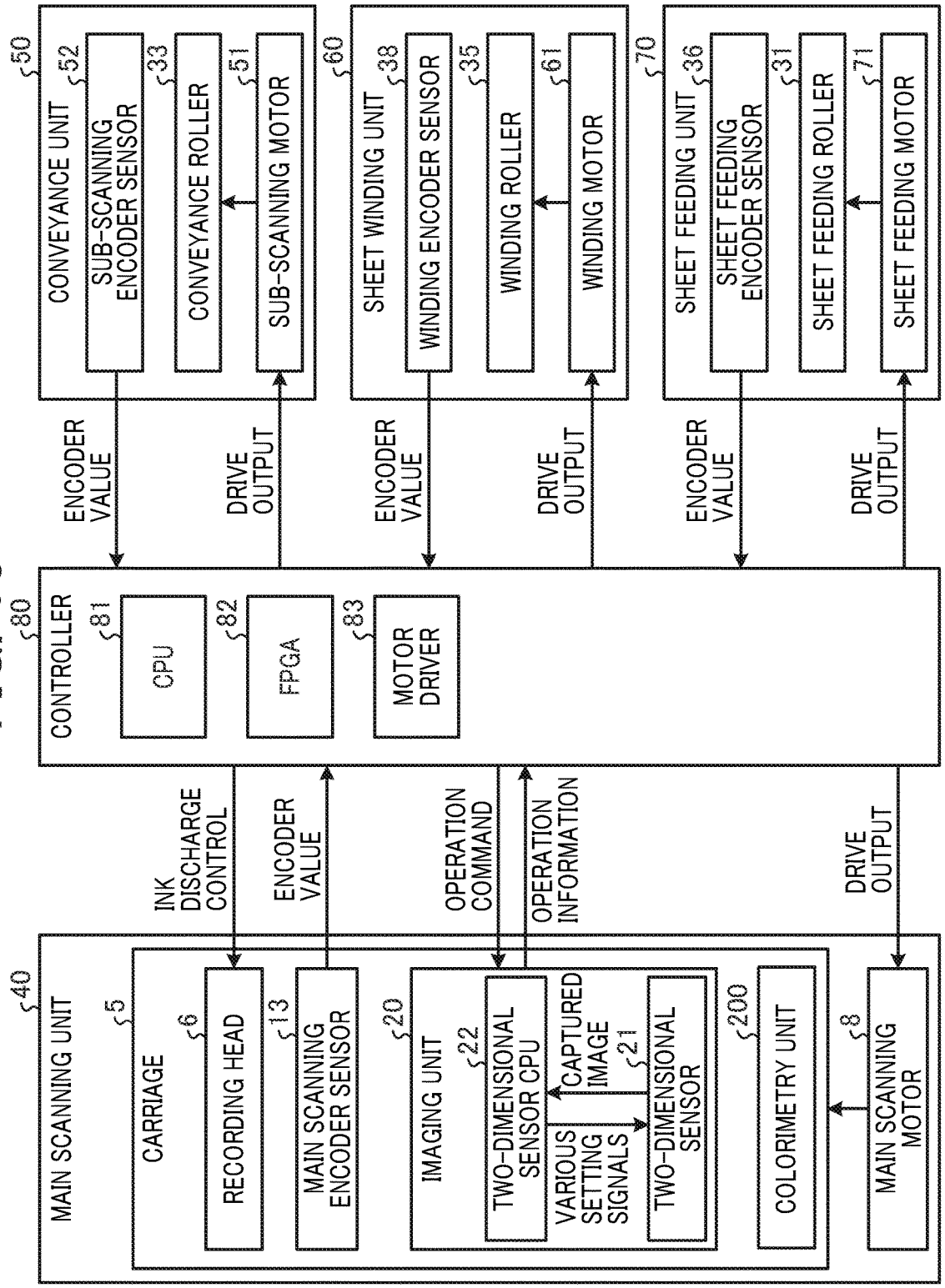
FIG. 16 is a block diagram illustrating a schematic configuration of a control mechanism of an image forming apparatus.

In the above-described embodiment, an image of a colorimetric pattern P is captured by the imaging unit 20, and a colorimetric value of the colorimetric pattern P is calculated by using the image data. However, as illustrated in FIGS. 15 and 16, a colorimetry unit 200 (e.g., implemented by a CPU) provided as a separate unit from the imaging unit 20 can be mounted on the carriage 5 together with the imaging unit 20, and the colorimetry unit 200 can perform colorimetry of the colorimetric pattern P.

In this case, the imaging unit 20 detects the marker pattern X, and then it is possible to calculate a distance (L−y×α+Lc [mm] or L+y×α+Lc [mm]) to a position where the colorimetry unit 200 can perform colorimetry of a patch P1-1 to be colorimetrically measured first in the colorimetric pattern P based on: a position (y×α [mm]) of a marker pattern X on an image captured by the imaging unit 20; a distance L between the marker pattern X on the recording medium M and a patch center of a first row of the colorimetric pattern P; and a distance Lc between the center of the imaging range 20a of the imaging unit 20 and a center of a colorimetry range of the colorimetry unit 200 (range indicated by a broken circle in FIG. 15). Then, since the recording medium M is conveyed in the sub-scanning direction B by this distance, the colorimetric pattern P and the colorimetry unit 200 can be aligned with high accuracy and colorimetry of the colorimetric pattern P can be appropriately performed.

MODIFIED EXAMPLE 3

In the above-described embodiment, the image forming apparatus 100 provided as the serial head inkjet printer is exemplified, but embodiments of the present disclosure is not limited to the above-described examples and can be effectively applied to various kinds of image forming apparatuses in which a colorimetric pattern P is formed on a recording medium M and colorimetry can be performed after a color of the colorimetric pattern P is stabilized.

Additionally, in the above-described embodiment, the drying process is performed in order to stabilize the color of the colorimetric pattern P, but the color of the colorimetric pattern P can also be stabilized by another method. For example, in a case of forming a colorimetric pattern P by using a coloring material that is cured by irradiation with ultraviolet or irradiation with electron rays, the color of the colorimetric pattern P is stabilized by curing the coloring material by irradiation with the ultraviolet or electron rays. Additionally, in a case of forming a colorimetric pattern P by using toner that is cured by heating and pressurization by a fixing mechanism like an electrophotographic image forming apparatus, the color of the colorimetric pattern P is stabilized by curing the toner by heating and pressurization. Note that the term "fixing" used in this specification represents a concept including: "drying" described in the above-described embodiment; and "curing" described in the present modified example.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image forming apparatus comprising:
    a conveyance device configured to convey a recording medium in a first direction and a second direction opposite the first direction;
    an image forming device configured to form at least one marker pattern and a colorimetric pattern on the recording medium;
    an imaging device configured to capture an image of the at least one marker pattern on the recording medium; and
    circuitry configured to control an operation of the image forming apparatus, the circuitry configured to:
        cause the image forming device to form the colorimetric pattern on the recording medium that has been conveyed in the first direction by a predetermined distance after formation of the at least one marker pattern; and
        cause the conveyance device to:
            convey the recording medium in the second direction by a reverse conveyance distance after the colorimetric pattern is fixed, the reverse conveyance distance equivalent to a target conveyance distance plus an error value;
            convey the recording medium in the first direction until the imaging device detects the at least one marker pattern; and
            convey the recording medium in the first direction to a colorimetry position where colorimetry of the colorimetric pattern is performed.

2. The image forming apparatus according to claim 1, wherein the at least one marker pattern includes a plurality of marker patterns positioned at different distances from the colorimetric pattern in the first direction, and
    wherein the circuitry is configured to cause the conveyance device to convey the recording medium in the first direction to the colorimetry position in response to detection of one of the plurality of marker patterns by the imaging device.

3. The image forming apparatus according to claim 2, wherein respective positions of the plurality of marker patterns are different in a direction orthogonal to the first direction.

4. The image forming apparatus according to claim 2, wherein respective colors of the plurality of marker patterns are different from each other.

5. The image forming apparatus according to claim 2, wherein respective shapes of the plurality of marker patterns are different from each other.

6. The image forming apparatus according to claim 1, wherein the circuitry is configured to:
    calculate, in response to detection of the at least one marker pattern by the imaging device, a distance to the colorimetric pattern from the imaging position of the imaging device based on a position of the detected at least one marker pattern on the captured image and the predetermined distance;
    causes the conveyance device to convey the recording medium in the first direction by the calculated distance to the colorimetric pattern; and
    cause the imaging device to capture an image of the colorimetric pattern.

7. The image forming apparatus according to claim 6, wherein the imaging device calculates a colorimetric value of the colorimetric pattern based on the captured image of the colorimetric pattern.

8. The image forming device according to claim 1, wherein:
    the error value is based on a type of the recording medium and the target conveyance distance.

9. A recording medium conveying method in an image forming apparatus, the method comprising:
    conveying a recording medium bearing a marker pattern by a predetermined distance in a first direction;
    conveying the recording medium in a second direction, opposite the first direction, by a reverse conveyance distance after a colorimetric pattern formed at the predetermined distance from the marker pattern is fixed, the reverse conveyance distance equivalent to a target conveyance distance plus an error value;
    conveying the recording medium in the first direction until the imaging device detects the marker pattern; and
    conveying the recording medium in the first direction to a colorimetry position where colorimetry of the colorimetric pattern is performed.

10. The recording medium conveying method according to claim 9, wherein:
    the error value is based on a type of the recording medium and the target conveyance distance.

11. A non-transitory recording medium storing a plurality of program codes which, when executed by one or more processors, causes the processors to perform a recording medium conveying method, the method comprising:
    conveying a recording medium bearing a marker pattern by a predetermined distance in a first direction;
    conveying the recording medium in a second direction, opposite the first direction, by a reverse conveyance distance after a colorimetric pattern formed at the predetermined distance from the marker pattern is fixed, the reverse conveyance distance equivalent to a target conveyance distance plus an error value;
    conveying the recording medium in the first direction until the imaging device detects the marker pattern; and
    conveying the recording medium in the first direction to a colorimetry position where colorimetry of the colorimetric pattern is performed.

12. The non-transitory recording medium according to claim 11, wherein:
    the error value is based on a type of the recording medium and the target conveyance distance.

* * * * *